US012219026B2

United States Patent
Muralidhara et al.

(10) Patent No.: US 12,219,026 B2
(45) Date of Patent: Feb. 4, 2025

(54) ENHANCEMENTS OF REGISTRATION OF NEF AT NRF

(71) Applicant: NOKIA TECHNOLOGIES OY, Espoo (FI)

(72) Inventors: Harish Muralidhara, Bangalore (IN); Pradyumna Ram Prasad, Bangalore (IN); M.krishna Murthy, Bangalore (IN)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/638,672

(22) PCT Filed: Aug. 30, 2019

(86) PCT No.: PCT/EP2019/073288
§ 371 (c)(1),
(2) Date: Feb. 25, 2022

(87) PCT Pub. No.: WO2021/037386
PCT Pub. Date: Mar. 4, 2021

(65) Prior Publication Data
US 2022/0294868 A1  Sep. 15, 2022

(51) Int. Cl.
*H04L 67/51*  (2022.01)
*H04W 4/50*  (2018.01)
*H04W 48/16*  (2009.01)

(52) U.S. Cl.
CPC ............... *H04L 67/51* (2022.05); *H04W 4/50* (2018.02); *H04W 48/16* (2013.01)

(58) Field of Classification Search
None
See application file for complete search history.

(56) References Cited

U.S. PATENT DOCUMENTS

2017/0251329 A1  8/2017  Bhalla
2018/0192471 A1*  7/2018  Li ........................... H04W 4/50
(Continued)

FOREIGN PATENT DOCUMENTS

| WO | WO 2018/165548 A1 | 9/2018 |
| WO | WO 2019/034609 A1 | 2/2019 |
| WO | WO 2020/187391 A1 | 9/2020 |

OTHER PUBLICATIONS

"ETSI TS 129 510 V15.3.0", 3GPP TS 29.510 version 15.3.0 Release 15. (Year: 2019).*
(Continued)

*Primary Examiner* — Tonia L Dollinger
*Assistant Examiner* — Jonathan A Sparks
(74) *Attorney, Agent, or Firm* — ALSTON & BIRD LLP (57) ABSTRACT

It is provided a method, comprising monitoring if a discovery request is received by a network resource function, wherein the discovery request comprises at least one of a type identifier of a type of an application function and a range indication of a range of one or more subscription identifiers; identifying, if the discovery request is received, an identity of a network exposure function based on the at least one of the type identifier and the range indication, wherein a registration of the network exposure function at the network resource function comprises the at least one of the type identifier and the range indication; providing the identity of the network exposure function in response to the discovery request.

6 Claims, 4 Drawing Sheets

(56) References Cited

U.S. PATENT DOCUMENTS

| | | |
|---|---|---|
| 2018/0317157 A1 | 11/2018 | Baek et al. |
| 2019/0020549 A1 | 1/2019 | Kim |
| 2019/0261260 A1 | 8/2019 | Dao et al. |
| 2019/0313468 A1* | 10/2019 | Talebi Fard .......... H04W 60/04 |
| 2022/0385741 A1* | 12/2022 | Muñoz De La Torre Alonso ....... H04L 41/0894 |
| 2024/0064105 A1* | 2/2024 | Sharma ............... H04L 43/0829 |

OTHER PUBLICATIONS

"3rd Generation Partnership Project; Technical Specification Group Core Network and Terminals; 5G System; Network Exposure Function Northbound APIs; Stage 3 (Release 16)", 3GPP TS 29.522 v16.0.0, (Jun. 2019), 43 pages.

"3rd Generation Partnership Project; Technical Specification Group Core Network and Terminals; 5G System; Network Function Repository Services; Stage 3 (Release 16)", 3GPP TS 29.510 v16.0.0, (Jun. 2019), 135 pages.

Ericsson, "NEF Discovery and Selection", 3GPP TSG-SA WG2 Meeting #134, S2-1907059, (Jun. 24-28, 2019), 2 pages.

Huawei et al., "pCR for TS 23.288 Clarifying Flexible AF Registration", 3GPP TSG-SA WG2 Meeting #132, S2-1904011, (Apr. 8-12, 2019), 4 pages.

Intel et al., "Clarification on NEF Discovery by an AF", SA WG2 Meeting #134, S2-1908596, (Jun. 24-28, 2019), 6 pages.

International Search Report and Written Opinion for Patent Cooperation Treaty Application No. PCT/EP2019/073288 dated Oct. 25, 2019, 14 pages.

Kaur, H., "UE Application Initiation and Offloading on MEC Deployments in a Standalone 5G Network", Retrieved on Jul. 20, 2022, Retrieved via the Internet: <URL: https://dzone.com/articles/ue-application-initiation-amp-offloading-on-mac-de>, (Feb. 21, 2019), 13 pages.

Mayer, G., "Restful APIS for the 5G Service Based Architecture", Journal of ICT, vol. 6.1&2, (May 2018), 16 pages.

* cited by examiner

Request NEF ID (AF type, SR) S110

Fig. 6

Register NEF at NRF (AF type, SR) S210

ENHANCEMENTS OF REGISTRATION OF NEF AT NRF

CROSS-REFERENCE TO RELATED APPLICATIONS

This application is a national phase entry of International Application No. PCT/EP2019/073288, filed Aug. 30, 2019, the entire contents of which are incorporated herein by reference.

FIELD OF THE INVENTION

The present invention relates to enhancements of registration of NEF at NRF and exploiting the enhancements.

ABBREVIATIONS

3GPP 3$^{rd}$ Generation Partnership Project
3G/4G/5G 3$^{rd}$/4$^{th}$/5$^{th}$ Generation
AF Application Function
AMF Access and Mobility Management Function
API Application Programming Interface
DNS Domain Name Service
EE Energy Efficiency
eMBB Enhanced Mobile Broadband
GPSI Generic Public Subscription Identifier
ID Identifier
IMS IP Multimedia Subsystem
IMSI International Mobile Subscriber Identity
IoT Internet of Things
IP Internet Protocol
KPI Key Performance Indicator
MCPTT Mission Critical Push To Talk
MTC Machine Type Communication
NEF Network Exposure Function
NF Network Function
NRF Network Function Repository Function
ProSe Proximity Service
REST Representational State Transfer
SBA Service-Based-Architecture
SLA Service Level Agreement
SR Subscriber Range
SUCI Subscription Concealed Identifier
SUPI Subscription Permanent Identifier
TR Technical Report
TS Technical Specification
UDM User Data Management
UE User Equipment
UECM UE Context Management
URI Unifier Resource Identifier
V2X Vehicle to Everything
VNF Virtualized Network Function

BACKGROUND OF THE INVENTION

3GPP defines a network function, called Network Exposure Function (NEF), which exposes 3GPP network capabilities to one or more Application Functions (AF) via RESTful APIs. Refer to 3GPP TS 29.522 for NEF specifications. An AF is outside of the 3GPP network.

NEF provides Northbound Interfaces for many Application Functions hosting different type of Applications (ranging from e.g. IoT to MCPTT; and for enterprises which may require huge and reliable bandwidth). The Northbound interface, Nnef exists between NEF and AF. 3GPP standards do not clearly specify how an AF could discover the NEF for accessing its APIs. There are many obvious solutions to do this.
 1. Statically provision NEF end-points at NRF,
 2. adding a DNS record and
 3. discovering the end-points from NRF
being some obvious solutions. The third option above, seems promising as it is in line with Service Based Architecture. 3GPP's 5G solution is relying on SBA.

Similarly, when an AF wants to be notified about a specific event occurring on any UE, it subscribes with the NEF within 5G core as defined in 3GPP TS 29.522.

SUMMARY OF THE INVENTION

It is an object of the present invention to improve the prior art.

According to a first aspect of the invention, there is provided an apparatus, comprising means for monitoring configured to monitor if a discovery request is received by a network resource function, wherein the discovery request comprises at least one of a type identifier of a type of an application function and a range indication of a range of one or more subscription identifiers; means for identifying configured to identify, if the discovery request is received, an identity of a network exposure function based on the at least one of the type identifier and the range indication, wherein a registration of the network exposure function at the network resource function comprises the at least one of the type identifier and the range indication; means for providing configured to provide the identity of the network exposure function in response to the discovery request.

According to a second aspect of the invention, there is provided an apparatus, comprising means for requesting configured to request an identity of a network exposure function from a network resource function, wherein the request comprises at least one of a type identifier of a type of an application function to be supported by the network exposure function and a range indication of a range of one or more subscription identifiers to be supported by the network exposure function.

According to a third aspect of the invention, there is provided an apparatus, comprising means for registering configured to register a network exposure function with a network resource function by a registration, wherein the registration comprises at least one of a type identifier of a type of an application function supported by the network exposure function and a range indication of a range of one or more subscription identifiers supported by the network exposure function.

According to a fourth aspect of the invention, there is provided a method, comprising monitoring if a discovery request is received by a network resource function, wherein the discovery request comprises at least one of a type identifier of a type of an application function and a range indication of a range of one or more subscription identifiers; identifying, if the discovery request is received, an identity of a network exposure function based on the at least one of the type identifier and the range indication, wherein a registration of the network exposure function at the network resource function comprises the at least one of the type identifier and the range indication; providing the identity of the network exposure function in response to the discovery request.

According to a fifth aspect of the invention, there is provided a method, comprising requesting an identity of a network exposure function from a network resource function, wherein the request comprises at least one of a type identifier of a type of an application function to be supported by the network exposure function and a range indication of a range of one or more subscription identifiers to be supported by the network exposure function.

According to a sixth aspect of the invention, there is provided a method, comprising registering a network exposure function with a network resource function by a registration, wherein the registration comprises at least one of a type identifier of a type of an application function supported by the network exposure function and a range indication of a range of one or more subscription identifiers supported by the network exposure function.

Each of the methods of the fourth to sixth aspects may be a method of resource registration or allocation.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
- some AFs may receive a preferred treatment by 5G core, which may be monetized;
- Only minimal changes to 3GPP TS 29.510 and 29.522 specification required.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The existing solution that defines the registration of NEFs with NRF for the discovery of NEF by any AF is still novice. The AF's discovery of NEF based on the AF's type (i.e. V2X, IoT, Enterprise solutions etc) or based on what kind of applications the NEF supports is not possible. It is also not possible to give preferred treatment for a certain set of Application Functions, based on an SLA.

As an effect, it is not possible to provide a preferred treatment to some $3^{rd}$ part AFs by the 5G Core network and to monetize such preferred treatment.

Conventionally, all AFs are treated as the same as there is no distinction made at NEF or at NRF while AF discovers NEF. NRF cannot make any distinction because NRF does not have any detailed information of NEFs, like the types of Applications NEF supports, or the Subscriber ranges it supports etc.). Knowing the Application Type would be helpful. For instance, only certain services of NEFs can scale out/in based on that application's spiky/high demands.

To summarize, as per current 3GPP specifications, there are the following problems:
1. When AF needs to find the appropriate NEF, there are no checks for the type of applications (e.g.: IoT, eMBB, MTC etc. at a coarse level, coarser or finer levels are feasible, too) that should discover one or more certain NEF(s). For example, NEFs may be for specific set of application function(s) rather than generically serving all application functions. That is, a certain NEF may be dedicated for a specific set of applications function(s) only.
2. If a specific Application Function (AF) causes heavy traffic, it is not possible to deploy NEFs for only this application with independent scalability. Conversely, it is not possible to have lesser resources dedicated to a NEF that handles lazy AFs (AFs with lesser throughput requirements).

3GPP does not mention any way to handle these situations. Also, the problems are explained considering mainly NEF and AF. One might encounter the above issues with other NFs, too, based on individual cases.

As a consequence of the problems 1 and 2 mentioned above, it is not possible to charge the Application Functions for any preference that might be given to them.

NEF currently isn't aware of the volatile demands of AF's traffic with itself, which is in turn dependent on usage of some specific applications. An AF is not able to quickly discover the best possible NEF based on the type of application it is interested in.

Currently when NEF registers with NRF,
1. There is no indication as to what subscribers the NEF or NEF/set is able to serve.
2. There is no grouping of NEF profiles/services for a set of AF types.

In the absence of such data, AF cannot have privileged handling at NEF based on SLA of QoS and other KPIs.

Figure 1:
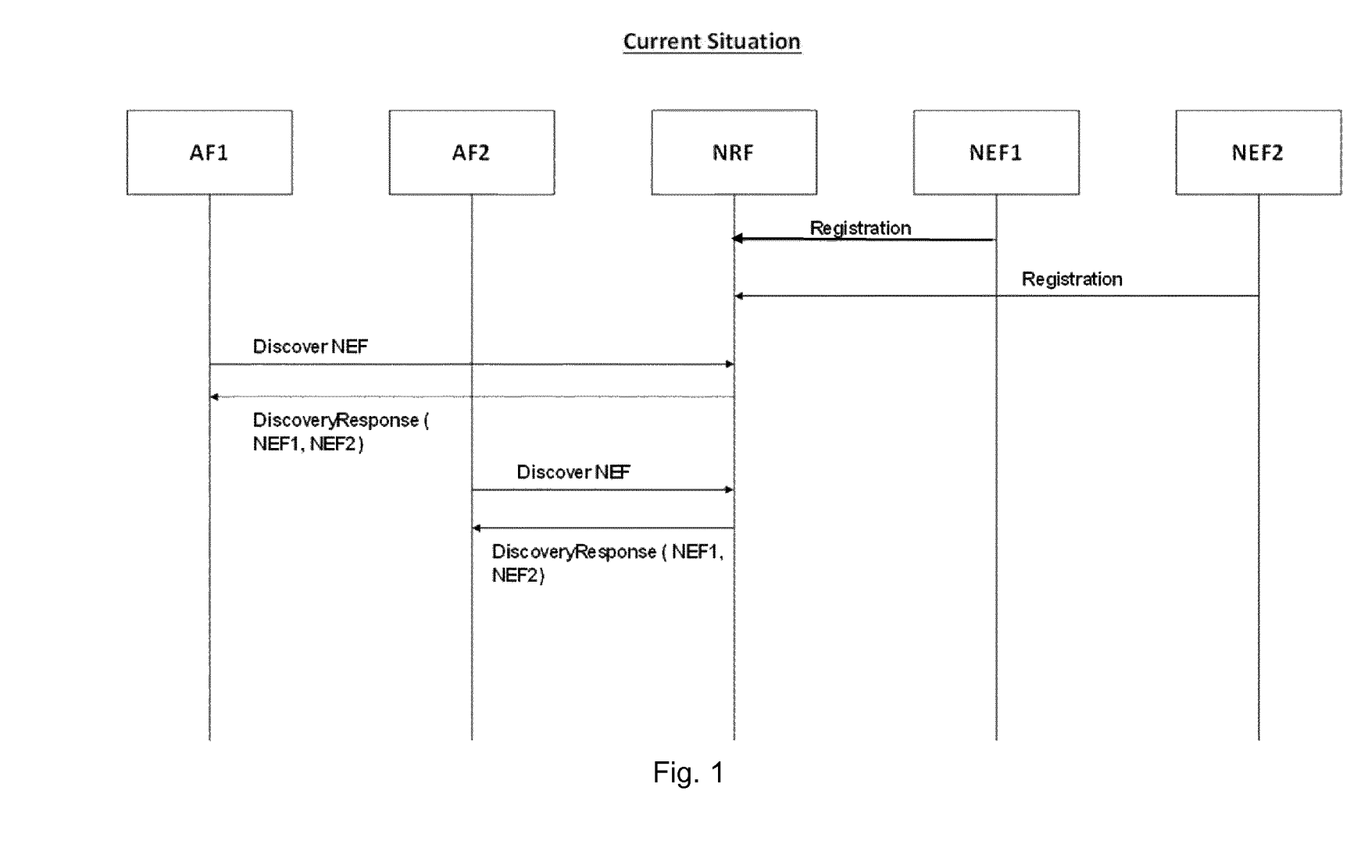
FIG. 1 shows a conventional message flow.

FIG. 1 depicts some problematic use-cases where the NEF's are seeing as the same by NRF and AF (from applications point of view). According to FIG. 1, NEF1 and NEF2 register with NRF without providing information on the applications supported by these NEFs and without providing information on the subscriber range(s) supported by these NEFs. When AF1 or AF2 discovers a NEF, NRF provides identifiers of both NEF1 and NEF2 in the DiscoveryResponse. There isn't any distinction with respect to the supported applications and/or the supported subscriber ranges.

According to some example embodiments of the invention, as a solution to the above problems, additional data are provided from NEF at registration at NRF. The data may comprise e.g. at least one of supported application (type) and supported subscriber range.

As an example, the data may look like the structure below:

```
NefInfo:
    type: object
    properties:
        groupId:
            $ref:
                'TS29571_CommonData.yaml#/components/schemas/NfGroupId'
        supiRanges:
            type: array
            items:
                $ref: '#/components/schemas/SupiRange'
            minItems: 1
        gpsiRanges:
            type: array
            items:
                $ref: '#/components/schemas/IdentityRange'
            minItems: 1
        externalGroupIdentifiersRanges:
            type: array
            items:
                $ref: '#/components/schemas/IdentityRange'
            minItems: 1
        externalAfIdentifiers:
            type: array
            items:
                $ref: '#/components/schemas/ExternalAppId'
            minItems: 1
    ExternalAppId:
        type: object
        properties:
            oneOf:
                identifier:
                    type: string
                pattern:
                    type: string
``` externalAfIdentifiers is a list of identities uniquely identifying the AFs or their type(s). (Example: V2X, ProseAF, IMS AF, . . . )

The definition of each of its element is defined by ExternalAppId. It can either have a regular expression (regex) in the pattern field or a fixed string under the identifier field. When AFs query for the NEF, they send the application ID or an indication of the application type in the NrfDiscovery request. In some example embodiments, the application ID or the indication of the application type may be a mandatory parameter.

If the NrfDiscovery request comprises a type of an application function and the NEFs are registered with their supported applications (or vice versa), NRF may map the application(s) to the respective application type. From a conceptual point of view, an identification of a single application may be considered as an identification of an application type, wherein the application type comprises the single application only.

Example Discovery request from AF which provides V2X service:

```
The Discovery request schema should add a new in-parameter.
-           name: requester-af-id
            in: query
            description: FQDN of the requester NF
            schema:
                $ref:
'TS29510_Nnrf_NFManagement.yaml#/components/schemas/AppId'
In TS29510_Nnrf_NFManagement.yaml, below type has to be added.
        AppId:
            type: string
Encoded URI:
    https://nrf.nokia.com/nnrf-disc/v1/nf-instances%3Ftarget-
nf-type%3DNEF%3Frequester-nf-type%3DAF%3Frequester-af-
id%3Dv2xInstance1
Decoded URI:
    https://nrf.nokia.com/nnrf-disc/v1/ nf-instances?target-
nf-type=NEF?requester-nf-type=AF?requester-af-id=v2xInstance1
```

Figure 2:
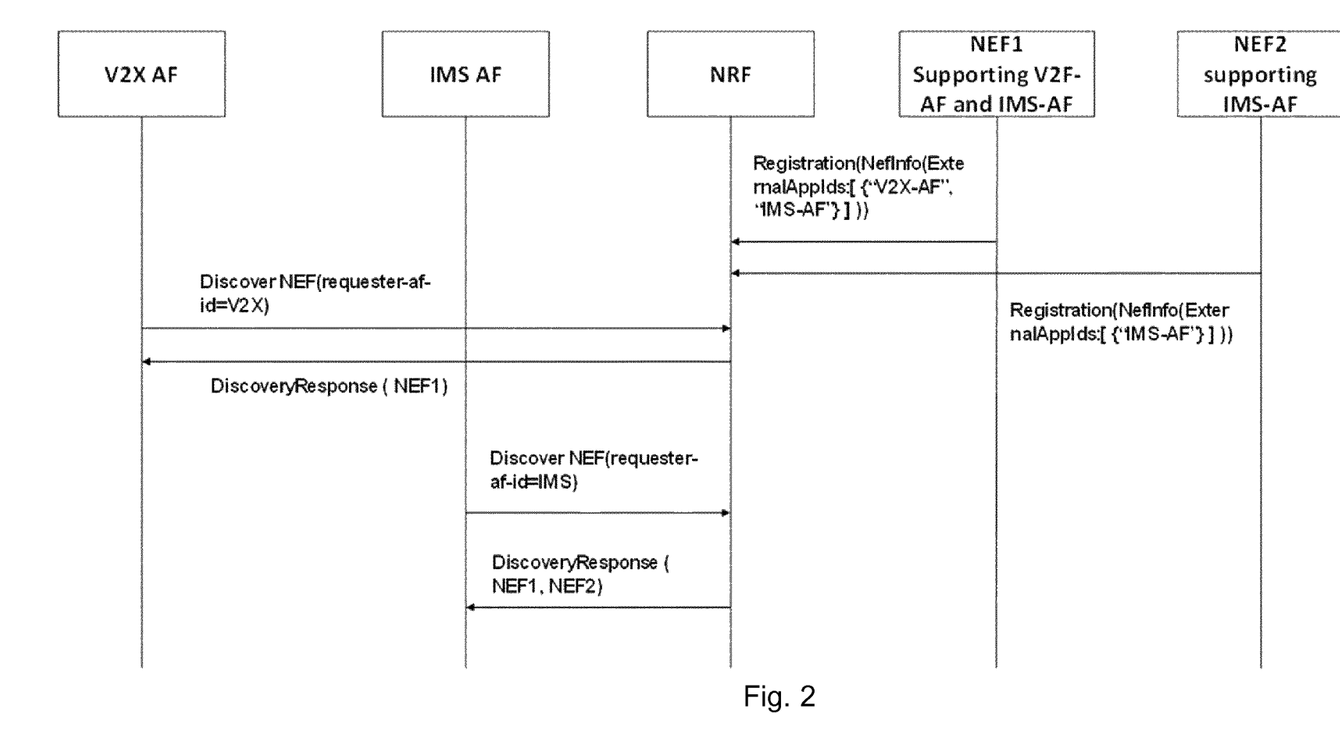
FIG. 2 shows a message flow according to some example embodiments of the invention.

FIG. 2 shows a message flow according to some example embodiments of the invention for the same use case as that shown in FIG. 1. As shown in FIG. 2, NEF1 indicates at registration at NRF that it supports V2X-AF and IMS-AF. Correspondingly, NEF2 indicates at registration at NRF that it supports IMS-AF. When V2X AF discovers a NEF, it includes information that it is related to V2X (V2X type). Then, the Discovery response to V2X AF comprises NEF1 only. On the other hand, when IMS AF discovers a NEF, it includes information that it is related to IMS (IMS type). Then, the Discovery response to IMS AF comprises NEF1 and NEF2.

Correspondingly, in some example embodiments of the invention, NEF may register at NRF indicating a supported subscriber range. When an AF discovers a NEF, it includes information on the relevant subscriber range. Then, the Discovery response to the AF comprises only those NEFs that support the indicated subscriber range. The subscriber range may be indicated by any appropriate subscriber identifier such as IMSI, SUPI, GPSI, and/or SUCI. For example, UDM-EE may discover NEF using only Subscriber Range or identity.

In some example embodiments, NEF registers with NRF indicating both one or more application types and one or more subscriber ranges. Correspondingly, an AF may discover NEF using both AF type and subscriber range. In the discovery response, NRF may provide an ID of a NEF fitting both the AF type and the SR.

If a registration request of a discovery request does not comprise an application type and/or a subscriber range, it is assumed that the respective NEF, AF, NF supports all application types and/or subscriber ranges, respectively.

It might happen that an AF or NF sends a discovery request indicating plural application types and/or a large subscriber range, but none of the NEFs is registered with these plural application types and/or subscriber ranges. If an NEF is registered with a subset of the plural application types and/or subscriber ranges, NRF may provide the ID of this NEF in the discovery response, together with an indication of the supported application types and/or subscriber range. If plural NEFs may fulfill jointly the requirement, NRF may provide the IDs of these NEFs in the discovery response, together with indications of the respective supported application types and/or subscriber ranges.

In some example embodiments of the invention, the NefInfo may reside in 2 places.
1. NfProfile level
2. NfService level for NEF Thus, a higher flexibility for assigning services to subscribers; reduced registration times; reduced latency; and/or higher granularity for load sharing may be achieved (see PCT/EP2019/056602). However, in some example embodiments of the invention, NefInfo resides at only one of these places.

Segregation of Nef Based on the Application Function Needs

The NEF Services that are created for a specific AF (e.g. IoT or V2X) will have the NefInfo as described above. This creates a Logical grouping of NEF endpoints serving a set of AFs or a specific type of AF.

In case the given set of NEF endpoints are overloaded, it is possible for another NEF instance to be scaled out and provide the services for the same set of AFs that are causing the load.

Due to the segregation, special QoS may be provided to specific applications. Thus, the operator may generate additional revenue based on higher QoS or better SLAs.

Figure 3:
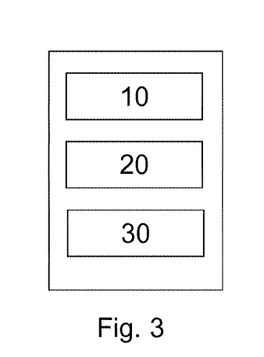
FIG. 3 shows an apparatus according to an example embodiment of the invention.
Figure 4:
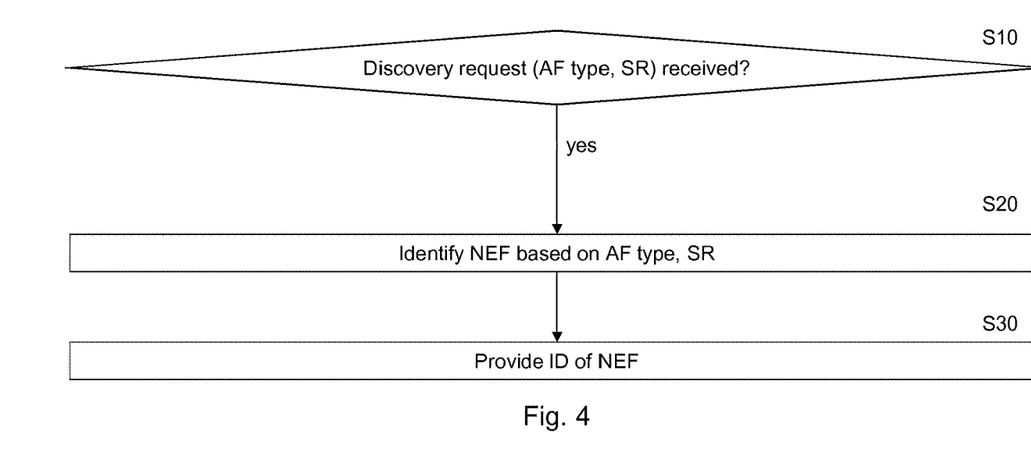
FIG. 4 shows a method according to an example embodiment of the invention.

FIG. 3 shows an apparatus according to an embodiment of the invention. The apparatus may be a repository function such as a NRF or an element thereof. FIG. 4 shows a method according to an embodiment of the invention. The apparatus according to FIG. 5 may perform the method of FIG. 4 but is not limited to this method. The method of FIG. 4 may be performed by the apparatus of FIG. 5 but is not limited to being performed by this apparatus.

The apparatus comprises means for monitoring 10, means for identifying 20, and means for providing 30. Each of the means for monitoring 10, means for identifying 20, and means for providing 30 may be a monitoring means, identifying means, and providing means, respectively. Each of the means for monitoring 10, means for identifying 20, and means for providing 30 may be a monitor, identifier, and provider, respectively. Each of the means for monitoring 10, means for identifying 20, and means for providing 30 may be a monitoring processor, identifying processor, and providing processor, respectively.

The means for monitoring 10 monitors if a discovery request is received by a network resource function (S10). The discovery request comprises at least one of a type identifier of a type of an application function and a range indication of a range of one or more subscription identifiers.

If the discovery request is received (S10=yes), the means for identifying 20 identifies an identity of a network exposure function based on the at least one of the type identifier and the range indication (S20). A registration of the network exposure function at the network resource function comprises the at least one of the type identifier and the range indication.

The means for providing 30 provides the identity of the network exposure function in response to the discovery request.

Figure 5:
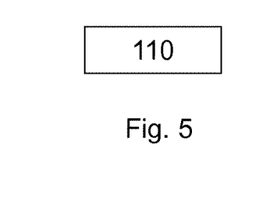
FIG. 5 shows an apparatus according to an example embodiment of the invention.
Figure 6:
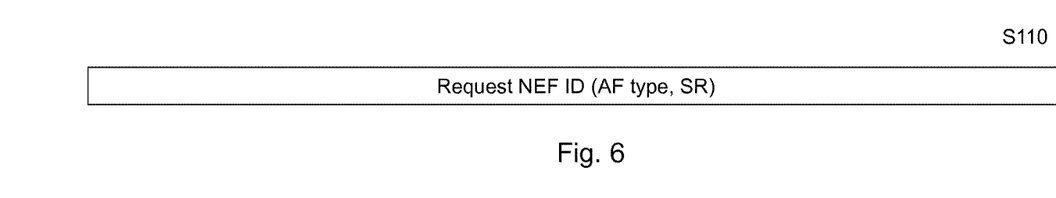
FIG. 6 shows a method according to an example embodiment of the invention.

FIG. 5 shows an apparatus according to an embodiment of the invention. The apparatus may be a function such as a AF or NF or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for requesting 110. The means for requesting 110 may be a requesting means. The means for requesting 110 may be a requester. The means for requesting 110 may be a requesting processor.

The means for requesting 110 requests an identity of a network exposure function from a network resource function (S110). The request comprises at least one of a type identifier of a type of an application function to be supported by the network exposure function and a range indication of a range of one or more subscription identifiers to be supported by the network exposure function.

Figure 7:
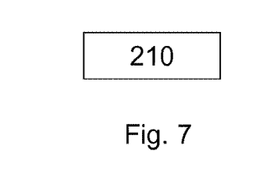
FIG. 7 shows an apparatus according to an example embodiment of the invention.
Figure 8:
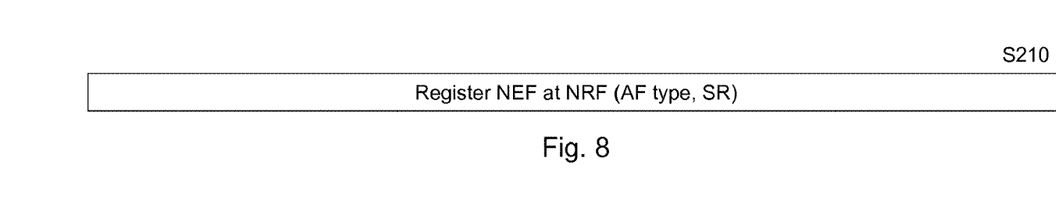
FIG. 8 shows a method according to an example embodiment of the invention.

FIG. 7 shows an apparatus according to an embodiment of the invention. The apparatus may be an exposure function such as a NEF or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for registering 210. The means for registering 210 may be a registering means. The means for registering 210 may be a registrar. The means for registering 210 may be a registering processor.

The means for registering 210 registers a network exposure function with a network resource function by a registration (S210). The registration comprises at least one of a type identifier of a type of an application function supported by the network exposure function and a range indication of a range of one or more subscription identifiers supported by the network exposure function.

Figure 9:
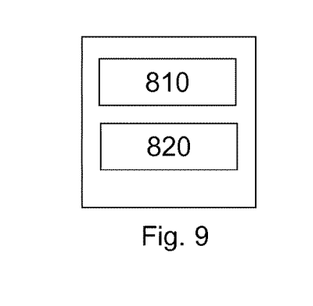
FIG. 9 shows an apparatus according to an example embodiment of the invention.

FIG. 9 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 5, 6, and 8.

Embodiments of the invention are described for 3GPP networks such as 3G networks, 4G networks, 5G networks. However, the invention is not restricted to 3GPP networks and may be employed in other wireless or wired networks, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a repository function such as a NRF or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, an application function or a network function, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, an exposure function such as a NEF, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising at least one processor and at least one memory including computer program code of a network repository function, which when executed by the at least one processor, causes the apparatus to at least perform:
   determining that a discovery request is received by the network repository function, wherein the discovery request comprises a plurality of application function identifiers, and wherein respective ones of the plurality of application function identifiers comprise a type identifier of a type of an application function;
   determining, in response to the discovery request being received, whether respective network exposure functions of a plurality of network exposure functions are registered with the respective ones of the plurality of application function identifiers;
   identifying, when determining that a respective network exposure function of the plurality of network exposure functions is registered with the plurality of application function identifiers, an identity of the respective network exposure function registered with the plurality of application function identifiers, wherein the respective network exposure function is capable of supporting the type of application function associated with the type identifier, and wherein a registration of the network exposure function at the network repository function comprises two or more application function identifiers that are supported by the network exposure function;
   identifying, responsive to determining that each of the plurality of network exposure functions is registered with less than all of the plurality of application function identifiers, identities of a subset of network exposure functions of the plurality of network exposure functions, wherein respective network exposure functions of the subset of network exposure functions are registered with a respective one or more application function identifiers of the plurality of application function identifiers, wherein the subset of network exposure functions jointly are registered with the plurality of application function identifiers; and
   providing the identity of the respective network exposure function or the identities of network exposure functions of the subset of network exposure functions and the respective one or more application function identifiers for each respective network exposure function of the subset of network exposure functions in response to the discovery request.

2. The apparatus according to claim 1, wherein the identifier of the application function indicates a single application function.

3. A method comprising:
   determining that a discovery request is received by a network repository function, wherein the discovery request comprises a plurality of application function identifiers, and wherein respective ones of the plurality of application function identifiers comprises a type identifier of a type of an application function;
   determining, in response to the discovery request being received, whether a-respective network exposure functions of a plurality of network exposure functions are is registered with the respective one of the plurality of application function identifiers;
   identifying, when determining that a respective network exposure function of the plurality of network exposure functions is registered with the plurality of application function identifiers, an identity of the respective network exposure function registered with the plurality of application function identifiers, wherein the respective network exposure function is capable of supporting the type of application function associated with the type identifier, and wherein a registration of the network exposure function at the network repository function comprises two or more application function identifiers that are supported by the network exposure function;
   identifying, responsive to determining that each of the plurality of network exposure functions is registered with less than all of the plurality of application function identifiers, identities of a subset of network exposure functions of the plurality of network exposure functions, wherein respective network exposure functions of the subset of network exposure functions are registered with a respective one or more application function identifiers of the plurality of application function identifiers, wherein the subset of network exposure functions jointly are registered with the plurality of application function identifiers; and
   providing the identity of the respective network exposure function or the identities of network exposure functions of the subset of network exposure functions and the respective one or more application function identifiers for each respective network exposure function of the subset of network exposure functions in response to the discovery request.

4. The method according to claim 3, wherein the identifier of the application function indicates a single application function.

5. The apparatus according to claim 1, wherein the plurality of application function identifiers further comprises a range indication of a range of one or more subscription identifiers.

6. The apparatus according to claim 1, wherein the type identifier comprises at least one of an Internet of Things (IoT) type, a Mission Critical Push to Talk (MCPTT) type, a Vehicle to Everything (V2X) type, or an Enterprise Solutions type.

* * * * *

UNITED STATES PATENT AND TRADEMARK OFFICE
CERTIFICATE OF CORRECTION

PATENT NO. : 12,219,026 B2
APPLICATION NO. : 17/638672
DATED : February 4, 2025
INVENTOR(S) : Harish Muralidhara et al.

Page 1 of 1

It is certified that error appears in the above-identified patent and that said Letters Patent is hereby corrected as shown below:

In the Claims

In Column 10, Line 20, Claim 3, delete "a-respective" and insert -- respective --, therefor.

In Column 10, Line 21, Claim 3, delete "are is" and insert -- are --, therefor.

Signed and Sealed this
Twenty-ninth Day of April, 2025

Coke Morgan Stewart
*Acting Director of the United States Patent and Trademark Office*